United States Patent [19]

Pan et al.

[11] Patent Number: 4,793,829
[45] Date of Patent: Dec. 27, 1988

[54] PERMEATION PROCESS FOR SEPARATING AMMONIA FROM A GAS MIXTURE

[75] Inventors: Chuen Y. Pan; Earl M. Hadfield, both of Edmonton, Canada

[73] Assignee: International Permeation, Inc., Calgary, Canada

[21] Appl. No.: 166,375

[22] Filed: Mar. 10, 1988

[51] Int. Cl.$^4$ .............................................. B01D 53/22
[52] U.S. Cl. ........................................... 55/16; 55/68; 55/70
[58] Field of Search ........................ 55/16, 68, 70, 158; 423/237, 359

[56] References Cited

U.S. PATENT DOCUMENTS

| | | | |
|---|---|---|---|
| 3,545,931 | 12/1970 | McKinley, Jr. | 55/16 X |
| 4,172,885 | 10/1979 | Perry | 55/16 X |
| 4,180,552 | 12/1979 | Graham et al. | 55/16 X |
| 4,180,553 | 12/1979 | Null et al. | 55/16 X |
| 4,398,926 | 8/1983 | Doshi | 55/16 |
| 4,645,516 | 2/1987 | Doshi | 55/16 |
| 4,690,695 | 9/1987 | Doshi | 55/16 |
| 4,762,535 | 8/1988 | Pez et al. | 55/16 |

Primary Examiner—Robert Spitzer
Attorney, Agent, or Firm—Ernest Peter Johnson

[57] ABSTRACT

A process is provided for separating ammonia from an ammonia synthesis purge gas stream containing ammonia, hydrogen, and contaminant gases. The process involves introducing the gas stream into a permeator equipped with a polysulphone amide gas separation membrane, to selectively permeate ammonia therethrough. The gas stream is at a temperature less than about 0° C. upon introduction to the permeation step. The polysulphone amide membrane surprisingly exhibits high permeability to ammonia permeation (relative to hydrogen) at low temperature. The ammonia is thus first separated by low temperature permeation and the hydrogen may then be recovered from the residue gas using a conventional membrane that exhibits high permeability to hydrogen. The two-step permeation process recovers ammonia and hydrogen in two separate streams and permits the use of a second stage membrane that would be deleteriously affected by ammonia in the hydrogen recovery step.

6 Claims, 1 Drawing Sheet

PERMEATION PROCESS FOR SEPARATING AMMONIA FROM A GAS MIXTURE

FIELD OF THE INVENTION

The invention relates to a permeation process for selectively separating ammonia from a gas mixture, such as ammonia synthesis purge gas, to thereby produce a residue gas substantially free of ammonia.

BACKGROUND OF THE INVENTION

The technology of ammonia synthesis processes is both sophisticated and highly complex.

However, at its most simplified, an ammonia synthesis process would comprise the following. Synthesis make-up gas, containing stoichiometric quantities of hydrogen and nitrogen, is compressed and introduced into a synthesis loop where it is combined with unreacted recycle gas. The gas mixture is passed to a reaction zone where hydrogen and nitrogen are reacted catalytically at superatmospheric pressure to produce ammonia. An effluent stream is withdrawn from the reaction zone and, following a series of heat exchange steps, the bulk of the ammonia is condensed and recovered therefrom. The vapour separated from this preceding recovery step (i.e. the recycle gas), which contains unreacted hydrogen, nitrogen and inert contaminants (typically methane and argon), is recompressed and returned to the reaction zone to mix with the synthesis make-up gas. A purge gas stream is vented from the synthesis loop in order to ensure that the level of inert contaminants entering the reaction zone does not exceed a pre-determined concentration. It is known that the presence of inert contaminants in the loop circulation system reduces the partial pressure of the hydrogen and nitrogen reactants, deleteriously affecting ammonia production.

The concentrations of unreacted hydrogen and nitrogen in the purge gas stream are equivalent to those in the recycle gas stream. It is normal commercial practice to recover hydrogen from the purge stream and return it to the synthesis loop, for economic reason.

Various methods of recovery of hydrogen from the purge gas stream have been proposed, exemplary of which are cryogenic or adsorption processes. One process being increasingly favoured involves a membrane permeation process.

The membrane permeation process relies on the differentials in permeation rates that exist for different gas molecules passing through a semi-permeable permeation membrane. The permeated gas is enriched with the more permeable components and conversely, the unpermeated or residue gas is enriched with the less permeable components.

In the prior art membrane permeation process, the purge gas stream is contacted in a permeator comprising a vessel having a permeation membrane contained therein. The permeator would structurally be like that described by Gardner et al. in Chemical Engineering Progress, October, 1977, pp. 76–78. The membrane utilized exhibits selectivity to the permeation of hydrogen therethrough. The commonly employed membrane material for this purpose are cellulose acetate and polysulphone, because of their high permeability to hydrogen. The membrane may be in the form of a bundle of hollow fibers. The fibre bundle is encapsulated at each end in epoxy tube sheets and the entire assembly is encased in a pressure vessel. The vessel forms a gas inlet, a permeate outlet and a stripped or residue gas outlet.

It has been found that the residual ammonia in the purge gas stream adversely affects the aforementioned commonly used prior art permeation membranes, leading to the eventual chemical decomposition thereof. Therefore, it has been necessary to subject the purge gas to an ammonia removal step prior to the hydrogen permeation step. Typically, the maximum ammonia tolerance limit of the cellulose acetate membrane is only about 10 psi ammonia partial pressure. Thus the ammonia removal step seeks to reduce the ammonia concentration to less than 0.5 mole % for a permeator operated at 2000 psia pressure.

In U.S. Pat. No. 4,172,885, E. Perry discloses a membrane permeation process for hydrogen recovery from the ammonia synthesis purge gas stream wherein the ammonia is removed from the stream by an adsorption or absorption pretreatment. The exemplary removal process is a water scrubbing treatment.

An alternative method for ammonia removal pretreatment is advanced by Doshi et al in U.S. Pat. No. 4,645,516. There a pressure swing adsorption treatment is employed in combination with a permeation membrane separation technique.

SUMMARY OF THE INVENTION

The present invention is founded on the discovery that a known gas separation membrane of particular composition exhibits selectivity to ammonia permeation therethrough. More particularly, the membrane is of polysulphone amide composition.

Furthermore, it has been discovered that, surprisingly, as the temperature of the feed gas stream and membrane is decreased, the permeability of said membrane to ammonia increases and reaches a practical useful level at about 0° C.

Additionally, it has been found that, at low temperatures, hydrogen will not effectively permeate through such a membrane. However, at higher feed gas and membrane temperatures, the membrane will exhibit increasing selectivity to hydrogen permeation therethrough.

Based on these discoveries, a novel process is provided for the removal of ammonia from a gas mixture stream.

Broadly stated, the invention comprises a process for separating ammonia from an ammonia-containing gas mixture stream which comprises: providing a permeator containing a polysulphone amide separation membrane exhibiting selectivity to ammonia permeation; introducing the gas stream into the permeator at a temperature below about 0° C.; and contacting the gas stream with the polysulphone amide separation membrane to separately produce an ammonia-rich permeate stream and an ammonia-lean residue stream.

In a preferred form of the invention, the gas feed is cool ammonia synthesis purge gas containing ammonia and hydrogen. The feed is first treated in a polysulphone amide membrane-containing permeator, to selectively permeate ammonia and recover separate ammonia-rich permeate and ammonia-lean residue streams. The ammonia-lean residue stream is then heated and treated in a second permeator containing a hydrogen permeable membrane, to produce a hydrogen-rich permeate stream and a hydrogen-depleted residue stream. The hydrogen-rich permeate stream may be recycled to the ammonia synthesis plant. The ammonia contained in the ammonia-rich stream may be recovered by condensation through compression and cooling.

BRIEF DESCRIPTION OF THE DRAWING

The FIGURE is a block diagram setting forth the feed stream, steps and conditions of the preferred process of the invention.

DESCRIPTION OF THE PREFERRED EMBODIMENT

Figure 1:
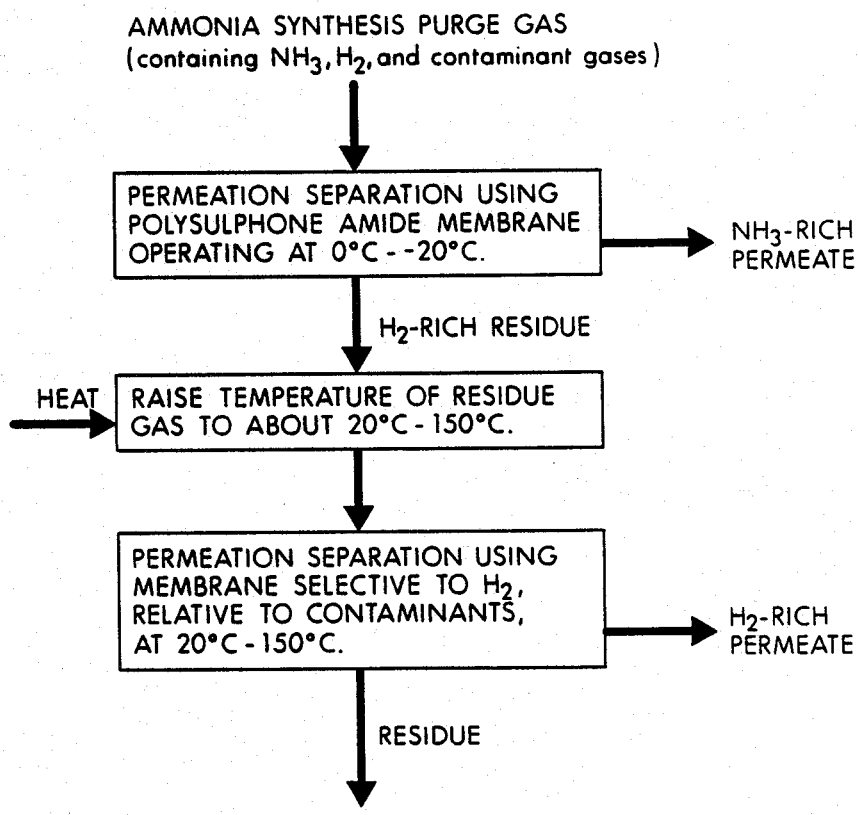

In the preferred form of the process, cool ammonia synthesis purge gas is treated in a first gas separation permeator equipped with a polysulphone amide membrane that is operative to selectively permit permeation therethrough of ammonia. The ammonia content of the purge gas is thereby reduced. The ammonia-lean residue stream from the first permeator may then be treated in a second gas separation permeator equipped with a membrane that is operative to selectively permit permeation therethrough of hydrogen, even though that second membrane may be deleteriously affected by ammonia. The system thus produces an ammonia-lean residue, from the first permeator, which is used to produce a hydrogen-rich permeate from the second permeator. This end is achieved entirely by the use of membranes, thereby eliminating the need for a water scrub or pressure swing adsorption pre-treatment step for ammonia removal.

In greater detail, the purge gas stream feed to the permeator circuit typically comprises:

| Component (volume %) | |
|---|---|
| $NH_3$ | 2.410 |
| $H_2$ | 57.19 |
| $N_2$ | 19.06 |
| $CH_4$ | 14.02 |
| Ar | 7.320 |

The purge gas is supplied at a temperature in the range of about 0° C. to −20° C., when fed to the first permeator.

The first permeator (as is also the case for the second permeator) is of conventional design, such as that described in the previously mentioned article by Gardner et al.

The first permeator contains a semi-permeable polysulphone amide membrane which exhibits selective permeation of ammonia, relative to the permeation of hydrogen, at a temperature in the order of about −10° C. Such a membrane is manufactured by Toyota Company Ltd. of Osaka, Japan, and is composed of poly(sulphone-amide) copolymers synthesized from isophthaloyl chloride and mixed diamines consisting of bis(4-(4-aminophenoxy)phenyl)sulphone and m-phenylenediamine. The membrane comprises a bundle of asymmetric hollow fibers of 145 μm ID and 340 μm OD, each having a thin outer permeation skin which is supported by a relatively thick, porous inner layer. A bundle of 8 inch diameter and 4 foot length typically provides about 1500 square feet of separation surface area.

The first permeator is typically operated at an upstream pressure of 1800 psig and downstream pressure of 300 psig. The ammonia-rich permeate gas exits the first permeator through a first outlet. The contained ammonia may be recovered by condensation through compression and cooling. The ammonia-lean residue gas exits the first permeator through a second outlet.

Typically, 80–90% of the ammonia content in the purge gas feed is separated in the first permeator and reports in the permeate gas stream.

The ammonia-lean residue gas from the first permeator, typically containing 50–60 mole % hydrogen, is then heated to a temperature dependent on the composition of the second stage hydrogen-permeable membrane. If a polysulphone amide ("PSA") membrane is used for the second stage, the ammonia-lean residue should be heated to about 50°–150° C. If a cellulose acetate ("CA") membrane is used, the ammonia lean residue should be heated to about 20°–70° C.

The heated residue gas is then treated in the second stage permeator, whose membrane, at the elevated temperature, is adapted to selectively pass hydrogen.

When the second stage permeator is equipped with a polysulphone amide membrane and operated at upstream and downstream pressures of 1800 psi and 300 psi respectively, a permeate stream typically containing about 94% hydrogen is produced, recovering about 90% of the hydrogen originally in the residue gas. When the second stage permeator is equipped with a cellulose acetate membrane and operated at upstream and downstream pressures of 1800 psi and 300 psi respectively, a permeate stream containing about 90% hydrogen is producing, recovering about 91% of the hydrogen.

EXAMPLE I

The data presented herebelow is included to demonstrate the increasing permeability of the polysulphone amide membrane to ammonia with decreasing temperature. The data further indicates that, while the permeability of the membrane to ammonia increases with decreasing temperature, exactly the opposite is true with respect to the other gas components involved.

The permeabilities of the polysulphone amide membrane to $NH_3$ and other gases were determined by permeation tests of mix-gas of $NH_3$, $H_2$, Ar, $CH_4$ and $N_2$. To minimize gas consumption, the tests were performed on a miniature permeator made of ten 36 cm long fibers in a U-loop configuration with the open ends of the fiber imbedded in a 3 cm long epoxy tube sheet. The permeator was housed in a 2 cm ID steel tube in order to reduce the void space around the fibers and eliminate channeling of feed gas flow. During the test, the high pressure feed gas was directed to flow through the shell side of the permeator at controlled pressure and temperature. The permeate gas was withdrawn from the fiber openings on the tube sheet. The residue flow rate from the permeator was regulated by a flow controller and the permeate back pressure was controlled with a needle valve. The composition of the feed gas was similar to a typical ammonia plant purge gas stream. Gas chromatographs and mass-flow meters were used to measure gas compositions and flow rates of the feed, residue and permeate streams.

In Table I is tabulated the permeabilities of polysulphone amide membrane for ammonia separation, derived in accordance with the foregoing procedure. Permeability is expressed as $x\ 10^{-6}\ cc(STP)/cm^2$, sec, cm-Hg.

TABLE I

| Temp. °C. | $NH_3$ | $H_2$ | Ar | $CH_4$ | $N_2$ |
|---|---|---|---|---|---|
| 23.5 | 118 | 9.475 | .2962 | .1994 | .2620 |
| 0 | 135 | 4.023 | .2480 | .2480 | .1512 |

TABLE I-continued

| Temp. °C. | $NH_3$ | $H_2$ | Ar | $CH_4$ | $N_2$ |
|---|---|---|---|---|---|
| −10 | 520 | 2.590 | .1695 | .1570 | .0863 |
| −16 | 1010 | 1.545 | .1232 | .0919 | .0535 |

EXAMPLE II

The following example is included to demonstrate the operability of the present invention.

Purge gas feed streams of composition detailed in Table II herebelow were introduced into a gas separation permeator in accordance with the experimental procedure previously described. The membrane was composed of polysulphone amide. The feed gas was cooled to 0° C. in Run 1, and to −10° C. in Runs 2 and 3. The test results are shown in Table II, which gives the gas compositions of the permeate and a residue streams obtained from the permeator. It is seen that about 80 to 90% of the ammonia in the feed gas is removed by the permeating gas stream, while more than 90% of the hydrogen in the feed is retained in the residue stream.

TABLE II

| | | Run 1 | Run 2 | Run 3 |
|---|---|---|---|---|
| Feed | Temperature, °C. | 0 | −10 | −10 |
| | Pressure, psia | 500 | 500 | 1800 |
| | Ar, mole % | 5.910 | 5.910 | 7.320 |
| | $CH_4$, mole % | 12.41 | 12.41 | 14.02 |
| | $N_2$, mole % | 18.16 | 18.16 | 19.06 |
| | $H_2$, mole % | 54.30 | 54.30 | 57.19 |
| | $NH_2$, mole % | 9.220 | 9.220 | 2.410 |
| Residue | Ar, mole % | 6.850 | 6.670 | 7.616 |
| | $CH_4$, mole % | 14.37 | 14.01 | 14.59 |
| | $N_2$, mole % | 21.21 | 20.73 | 19.85 |
| | $H_2$, mole % | 56.49 | 57.75 | 57.54 |
| | $NH_3$, mole % | 1.090 | 0.830 | 0.400 |
| Permeate | Pressure, psia | 13.50 | 13.50 | 25.0 |
| | Ar, mole % | 0.300 | 0.270 | .4379 |
| | $CH_4$, mole % | 0.630 | 0.550 | .7676 |
| | $N_2$, mole % | 0.560 | 0.460 | .5778 |
| | $H_2$, mole % | 41.18 | 30.90 | 49.03 |
| | $NH_3$, mole % | 57.33 | 67.82 | 49.19 |
| Fraction of $H_2$ in Feed Permeated | | 0.1083 | 0.0732 | 0.0353 |
| Fraction of $NH_3$ in Feed Permeated | | 0.8893 | 0.9209 | 0.8409 |

The embodiments of the invention in which an exclusive property or privilege is claimed are defined as follows:

1. A process for separating ammonia from an ammonia-containing gas mixture stream, which comprises:
   providing a permeator containing a polysulphone amide separation membrane exhibiting selectivity to ammonia permeation;
   introducing the gas stream into the permeator at a temperature below about 0° C.;
   and contacting the gas stream with the polysulphone amide separation membrane to separately produce an ammonia-rich permeate stream and an ammonia-lean residue stream.

2. The process as set forth in claim 1 wherein:
   the gas mixture stream is purge gas from an ammonia synthesis circuit.

3. The process as set forth in claim 2, further comprising:
   introducing the ammonia-lean residue stream into a second permeator and contacting said stream with a second separation membrane having selectivity to hydrogen permeation, to produce a hydrogen-rich permeate stream and a hydrogen-lean residue stream.

4. The process as set forth in claim 3 wherein said second separation membrane is a cellulose acetate membrane.

5. The process as set forth in claim 2 further comprising:
   introducing the gas stream into the first permeator at a temperature in the range of about 0° C. to −20° C.;
   heating the ammonia-lean residue stream to a temperature in the range of about 20° C. to 150° C.; and
   introducing the heated ammonia-lean residue stream into a second permeator and contacting said stream with a second separation membrane having selectivity to hydrogen permeation, to produce a hydrogen-rich permeate stream and a hydrogen-lean residue stream.

6. The process as set forth in claim 5 wherein:
   the separation membrane in the second permeator is polysulphone amide.

* * * * *